Nov. 11, 1969     M. M. DOTY     3,477,479

SAW BLADE

Filed Sept. 7, 1967

INVENTOR
MYRLE M. DOTY

BY
Mann, Brown + McWilliams
ATTORNEYS

United States Patent Office 3,477,479
Patented Nov. 11, 1969

3,477,479
SAW BLADE
Myrle M. Doty, 818 Stevens Ave., Sycamore, Ill. 60178
Filed Sept. 7, 1967, Ser. No. 666,151
Int. Cl. B27b 19/02
U.S. Cl. 143—133                             4 Claims

ABSTRACT OF THE DISCLOSURE

A saw blade for portable reciprocating power saws of sabre saw type in which the end of the blade is given a curvature to enable self-starting of the blade while minimizing breakage of the blades.

---

The present invention is directed to new and useful improvements in reciprocating, hand-manipulated, power saws of the type sometimes referred to as sabre saws, hack saws or jig saws.

Saw blades for this general type of power saw are oftentimes used to make cuts lying wholly within the cut material. When making such a cut, the user of oftentimes drills a hole and then inserts the blade, after which time the cutting action is started. Some prior saw blades with generally rectilinear cutting edegs have been self-starting in the sense that the reciprocating action of the blade will start its own hole in the material being cut but blades of this latter type rely at times on more or less of a pounding action to start the hole, wtih the result that blades used in this manner are broken rather easily. This is especially true if the material being cut is relatively hard. Also, the forwardmost teeth in blades of this type tend to catch in the material being cut.

With the foregoing in mind, the principal purposes of the present invention are to so form saw blades of the sabre saw, hack saw or jig saw type that they easily start their own hole in the material being cut while minimizing undue shock of, and attendant breakage of, blades of this type, all while enabling use of the blade in cutting material in conventional fashion and while enabling the simple manufacture of such blades, these and other purposes being more apparent in the course of the ensuing specification and claims when taken in connection with the accompanying drawings, wherein:

Like elements are designated by like characters throughout the specification and drawings.

Figure 1:
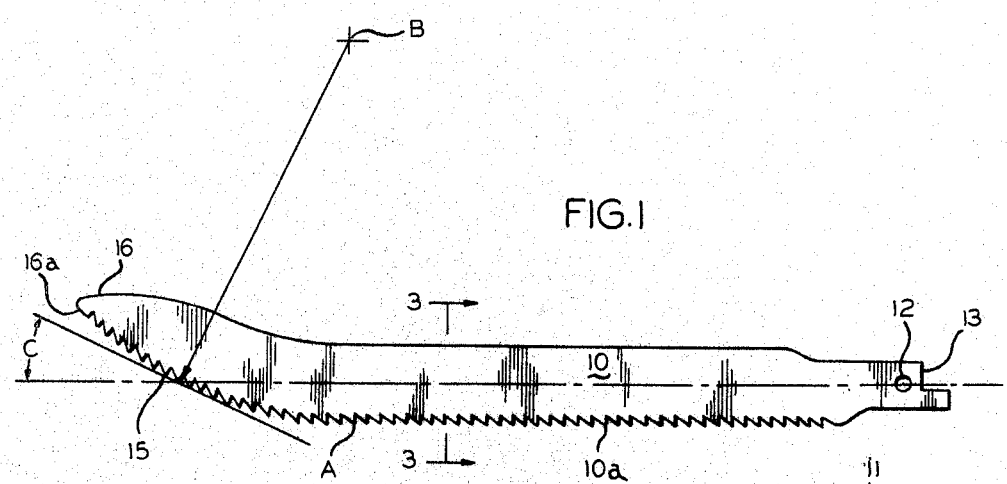
FIGURE 1 is a side view of a typical blade formed in accordance with the present invention.

With specific reference now to the drawings, and in the first instance to FIGURE 1, the numeral 10 generally designates an elongated blade body which may be of plate-like steel stock. The blade body has a shank end portion 11 which is formed with a holding aperture 12, and a shoulder 13 for reception within the chuck of a portable power hack saw as generally designated at 14 in FIGURE 2. A holding chuck or clamp is generally designated at 14a. It should be understood that the configuration of the shank end portion 11 is intended to be representative of a conventional shank end portion received within the chuck of a reciprocating sabre saw.

The blade body 10 has one side edge thereof formed with saw teeth 10a which are given a rearward rake or a rake extending toward the shank end portion of the body. This side edge of the blade body has a rectilinear expanse from the point generally designated at A and extending to or near the shank end portion. This rectilinear edge portion preferably forms a major part of the overall length of the saw blade. The toothed side edge 15 of the blade body from the point A to the forward end 16 has a curvilinear form and is struck about a center generally designated at B which is positioned inwardly of the extreme end of the blade body and to one side of the blade body. This curvature of the side edge between the end 16 and point A is such that it is tangent to the rectilinear portion of the toothed edge. The curvature should be such as to avoid the effect of a sharp break or corner at the point A.

It is preferred that the extreme forward end of the toothed side be left without teeth as shown at 16a. This rounded surface is on the same radius as the tips of the teeth and may have a length of approximately ¼ inch. This rounded surface helps to free the forwardmost teeth from being snagged or caught in the material being cut.

A practical curvature for a blade having an overall length of 9¾″ is approximately 4¼″ struck about the point B. The curvature should be sufficiently large that the included angle C between the longitudinal axis of the holding chuck of the blade and a tangent drawn through the axis and the curve defined by the teeth of the blade is less than approximately forty-five degrees.

Figure 2:
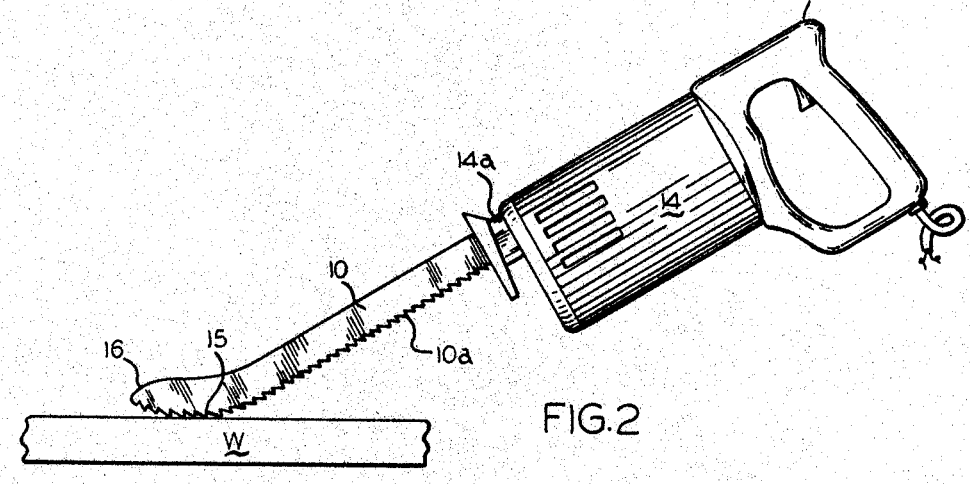
FIGURE 2 is a diagrammatic view illustrating the manner in which blades made in accordance with the present invention are used to start a hole in the material being cut.
Figure 3:
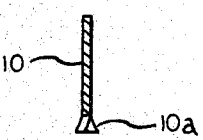
FIGURE 3 is a sectional view of the blade illustrated in FIGURE 1.
Figure 4:
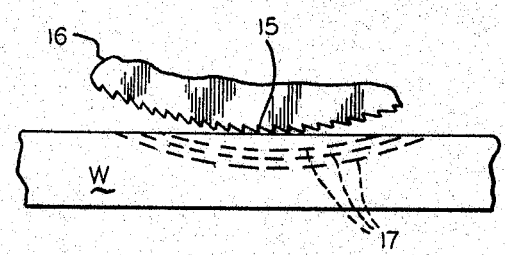
FIGURE 4 is an enlarged diagrammatic view illustrating the action of the teeth of the blade in starting a cut.

The toothed form on the side edge may be conventional as long as the teeth have a rearward rake as shown. In use, the saw blade is positioned against the work W as illustrated in FIGURE 2 wherein the longitudinal axis of the blade is directed at an inclination to the plane of the work surface being cut. As the blade is reciprocated by the power unit 14, one or several teeth, as designated at 10a in FIGURE 4, will dig into and remove a portion of the material and, as the reciprocation of the blade continues, progressively more and more teeth will dig in, thus forming an ever deepening curvilinear cut as designated by the lines 17 in FIGURE 4. Thus cutting action will progress until the blade has cut through the workpiece, after which time the rectilinearly extending toothed edge 14 may cut the work in conventional fashion. As the curved edge reaches the surface opposite to the surface on which the cut was started, the curved edge breaks through neatly without snagging the end teeth on the opposite surface.

The blade body may be formed from ordinary blade steels for cutting wood. The blade body may be formed from a known carbide form of steel if it is desired to cut through sheet metal or other metal materials. The blade body may also be used to cut glass through use of blade steels and tooth forms known for glass cutting purposes.

Whereas I have shown and described an operative form of the invention, it should be understood that this showing and description thereof should be taken in an illustrative or diagrammatic sense only. There are modifications to the invention which will fall within the scope and spirit thereof and which will be apparent to those skilled in the art. The scope of the invention should be measured only by the scope of the hereinafter appended claims.

I claim:

1. A self-starting saw blade for use with reciprocating power saws including an elongated blade body formed from metal-like plate material, said body having a shank end portion formed and adapted for reception and holding within the chuck of a reciprocating power saw, said body having the other end portion with a curved side edge thereof formed substantially on a radius struck about a center positioned to one side of said body and positioned inwardly of the extreme ends of said body, the side edge of said body defining said curved end portion being provided with saw teeth, said curved side edge merging tangentially with a rectilinear side edge portion of said body, said rectilinear side edge portion extending between said curved end portion and said shank end portion and having saw teeth formed therein said teeth having a rearward rake in the direction of said shank end portion.

2. The structure of claim 1 wherein said curved side edge portion is formed on a radius such that a tangent struck on said curved edge portion and passing through the longitudinal axis of said blade body forms an included angle of less than approximately forty-five degrees with said longitudinal axis.

3. The structure of claim 1 wherein the side edge of said other end portion includes a smooth surface of short extent struck on said radius and extending between teeth and the extreme forward end of said blade.

4. A reciprocating portable power saw of the sabre saw type including a motor and a reciprocating chuck carried by said motor, an elongated blade body formed from metal-like plate material, said body having a shank end portion received within said chuck, said body having the other end portion with a side edge thereof formed on a radius struck about a center positioned to one side of said body and positioned inwardly of the extreme ends of said body, the side edge of said body defining said curved end portion being provided with saw teeth said curved side edge merging tangentially with a rectilinear side edge portion of said body, said rectilinear side edge portion extending between said curved end portion and said shank end portion and having saw teeth formed therein said teeth having a rearward rake in the direction of said shank end portion.

References Cited

UNITED STATES PATENTS

| 2,646,094 | 7/1953 | Russell. | |
|---|---|---|---|
| 2,908,077 | 10/1959 | Bahlmann | 30—272 |
| 2,853,106 | 9/1958 | Kanthack | 145—31 X |

FOREIGN PATENTS

| 453,529 | 12/1927 | Germany. |
|---|---|---|

DONALD R. SCHRAN, Primary Examiner

U.S. Cl. X.R.

143—68